United States Patent [19]

Robinson

[11] 4,223,429
[45] Sep. 23, 1980

[54] PROCESS FOR BONDING MAIN ROTOR BLADES FROM PARTS HAVING DIFFERENT COEFFICIENTS OF THERMAL EXPANSION

[75] Inventor: Frank D. Robinson, Rancho Palos Verdes, Calif.

[73] Assignee: Robinson Helicopter Company, Torrance, Calif.

[21] Appl. No.: 938,930

[22] Filed: Sep. 1, 1978

[51] Int. Cl.³ .............................................. B23P 15/04
[52] U.S. Cl. ........................... 29/156.8 B; 29/156.8 P; 156/91; 156/222; 156/306.9
[58] Field of Search ..................... 29/156.8 B, 156.8 P; 156/309, 311; 416/213 R, 213 A, 229 R

[56] References Cited

U.S. PATENT DOCUMENTS 2,965,530  12/1960  Stamm et al. ..................... 156/309
3,004,607  10/1961  Linnabery et al. ............... 29/156.8 P Primary Examiner—Daniel C. Crane
Attorney, Agent, or Firm—Smyth, Pavitt, Siegemund, Jones & Martella

[57] ABSTRACT

A process for bonding together into a composite structure parts having different coefficients of thermal expansion by use of an adhesive which cures at a curing temperature different from the use temperature at which the structure is to be used, including the steps of applying the adhesive in an uncured state to the parts, then affixing the parts together rigidly at the use temperature to form the composite structure prior to during the adhesive, then curing the adhesive at the curing temperature while keeping the parts affixed together and simultaneously permitting the composite structure to change shape in accordance with the different coefficients of thermal expansion of the parts, the latter step being accomplished by holding the composite structure in a fixture which includes clamping plates which prevent twisting and buckling of the composite structure as its temperature is changed and in which the clamping plates are mounted so as to permit them to shift position to accommodate the bowing of the composite structure resulting from the different expansion coefficients of the parts which are affixed together.

14 Claims, 7 Drawing Figures

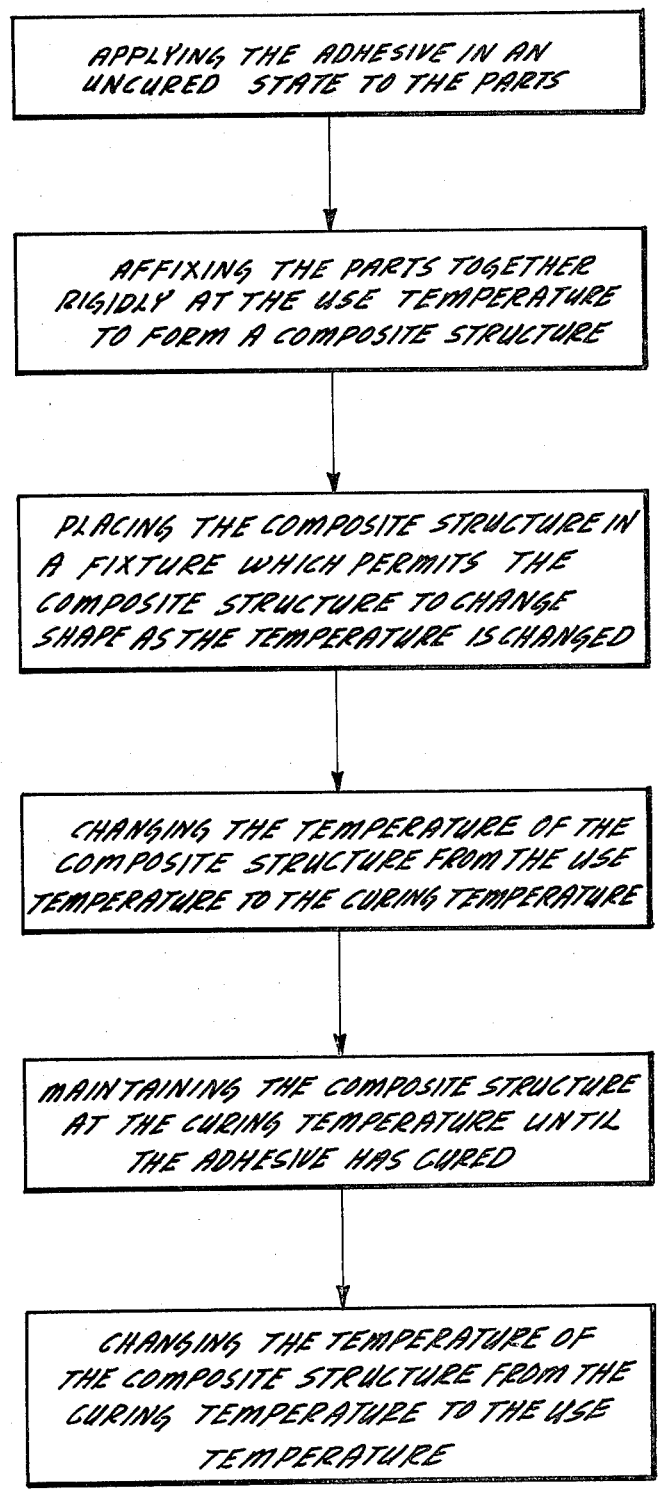

PROCESS FOR BONDING MAIN ROTOR BLADES FROM PARTS HAVING DIFFERENT COEFFICIENTS OF THERMAL EXPANSION

BACKGROUND OF THE INVENTION

The present invention is in the field of helicopters, and more specifically relates to a manufacturing process and fixture for use in fabricating the main rotor blade of a helicopter.

Contemporary main rotor blades are hollow, being formed of a reinforced leading edge which is attached to a skin which defines the aerodynamic surfaces. From a structural standpoint to prevent erosion, it is desirable that the leading edge be made of steel, while the skin covering the remainder of the blade be made of aluminum.

There are advantages to bonding, rather than riveting, the components of the rotor blade together to form a unitary structure, but the bonded blades of dissimilar metals have not proven satisfactory. When rotor blades are bonded of dissimilar metals having different coefficients of thermal expansion, using conventional bonding techniques, the blades are usually found to be warped or bowed when they are removed from the bonding fixture.

This adverse result is caused by the fact that the bonding takes place while the blade is at an elevated temperature required to cure the adhesive so when the blade is cooled back down to room temperature, the material having the higher coefficient of thermal expansion will shrink the most. For example, if the aft portion of the blade is made of aluminum and the forward portion of steel, the blade will bow aft when it is removed from the bonding jig, assuming the jig is rigid and straight. In addition to bowing of the blade, which affects its balance and control of feedback, the blade will also have detrimental internal stresses bonded into its structure which can lead to premature fatigue failure. Thus, the use of techniques known to the prior art does not result in the most desirable rotor blade when bonded of dissimilar metals.

SUMMARY OF THE INVENTION

The bonding technique of the present invention eliminates the problem of bowing and internal stresses encountered with prior art techniques. According to the present invention, the dissimilar metals of the rotor blade are mechanically affixed together through the use of suitable fasteners such as bolts or rivets. Only a few fasteners are used, since their only function is to hold the parts together in the presence of thermal stresses until the bonding adhesive sets. Thereafter, the fasteners could, in theory, be removed; although in practice some are not removed. After the fasteners have been applied, the blade is then placed in a bonding fixture, and assembly of the blade is completed by applying the bonding adhesive. Next, the fixture is brought into engagement with the blade to hold it during curing of the adhesive. All of the steps to this point have been carried out at room temperature or at the temperature at which the blade is designed to be used.

Next, the blade and the portion of the bonding fixture which holds it are heated to an elevated temperature sufficient to cure the adhesive. The bonding fixture is designed to permit the blade to bow freely but does not permit the blade to twist or vary its cross-sectional shape. The bonding takes place with the blade bowed at the elevated temperature and with considerable internal stresses in the dissimilar metals. The internal stresses are produced as the parts having greater coefficients of thermal expansion attempt to expand more than the other parts but are prevented from doing so by the aforementioned mechanical fasteners. The adhesive sets up at the elevated temperature, bonding the parts together at that temperature.

Next, the bonded blade is cooled again to room temperature where it resumes its original unbowed configuration in which the internal stresses have returned to zero.

The novel features which are believed to characterize the invention, both as to the technique and the structure of the bonding fixture, together with further objects and advantages thereof, will be better understood from the following description considered in connection with the accompanying drawings in which a preferred embodiment of the invention is illustrated by way of example. It is to be understood, however, that the drawings are for the purpose of illustration and description only, and are not intended as a definition of the limits of the invention.

DETAILED DESCRIPTION OF THE PREFERRED EMBODIMENT

Figure 1:
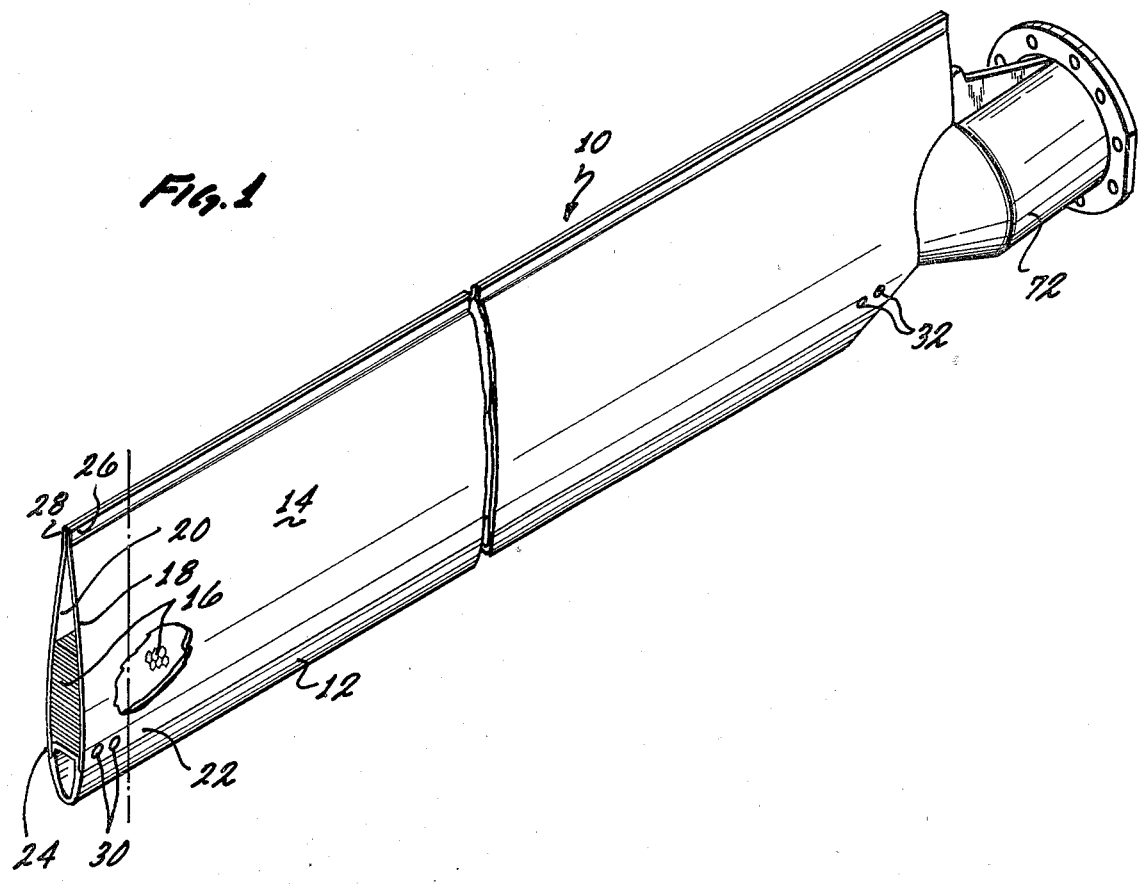
FIG. 1 is a perspective view of a main rotor blade of the type produced in accordance with the present invention.

Turning now to the drawings in which like parts are denoted by the same reference numeral throughout, FIG. 1 is a perspective view showing the rotor blade 10 produced by the method and apparatus of the present invention. A typical rotor blade may have a chord of 8 inches and a length of 140 inches. The blade includes a spar 12 extending along its leading edge and a skin 14 which defines its aerodynamic surfaces. In a preferred embodiment, the space within the rotor blade is filled with a metallic honeycomb material 16.

For structural reasons, it is desirable to use a steel extrusion for the spar 12, and to use plates of aluminum as the skin 14. In the preferred embodiment, the skin 14 is bonded to the spar 12 and to the honeycomb 16.

In a preferred embodiment, the bonding adhesive is supplied in the form of sheets or tape which is applied between the parts to be bonded, and then is cured at an elevated temperature. Bonding materials such as FM 123, and FM 1000 supplied by American Cyanamid Corporation, have been found to produce satisfactory results. These bonding materials cure at 260° F. and 340° F. respectively.

According to a preferred embodiment of the present invention, two panels of skin 18, 20 form the upper and lower aerodynamic surfaces of the rotor blade, respectively. The front portions 22, 24 of the panels 18, 20 are bonded to the spar 12, while the rear portion 26, 28 are bonded together at the trailing edge of the blade.

The first step in assembling the rotor blade is to bolt the spar 12 to the root fitting 72. The skin 14 is then bolted to the spar 12 at the end of the spar nearer the root fitting by the bolts 32, while at the tip of the blade the skin 14 is attached to the spar 12 by the rivets 30.

Figure 2:
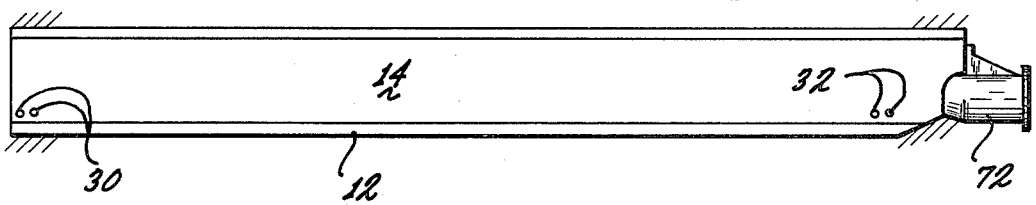
FIG. 2 is a plan view of the blade of FIG. 1 at the temperature at which it is normally used.
Figure 3:
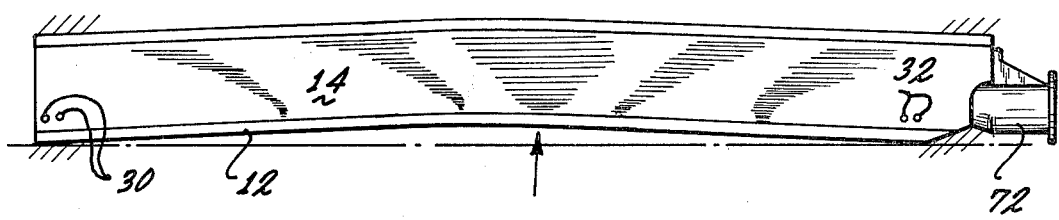
FIG. 3 is a plan view of the blade of FIG. 1 at an elevated curing temperature showing the bowing of the blade exaggerated.

When the fasteners 30, 32 have been put in place, the structure at room temperature will have the appearance shown in the plan view of FIG. 2. The fasteners 30, 32 are put in place at the temperature at which the blade is to be used, and this temperature is approximated adequately by room temperature in most applications. When the rotor blade is heated to an elevated temperature to cause the bonding adhesive to set, the blade assumes the shape shown in FIG. 3 in exaggerated form. That is, the aluminum skin expands more than the steel spar 12 causing the blade to bow upwardly as shown in FIG. 3, and this has a tendency to cause the skin 14 to buckle as indicated in FIG. 3.

To prevent the skin 14 from buckling, it is necessary to clamp the skin 14 to hold it against the honeycomb 16 and to hold the rear portions 26, 28 together. On the other hand, whatever system of clamps is used to hold the skin 14 during bonding must not interfere with the bowing action shown in FIG. 3. Further, the clamping mechanism must hold the rotor blade from twisting about an axis extending along its length.

Figure 4:
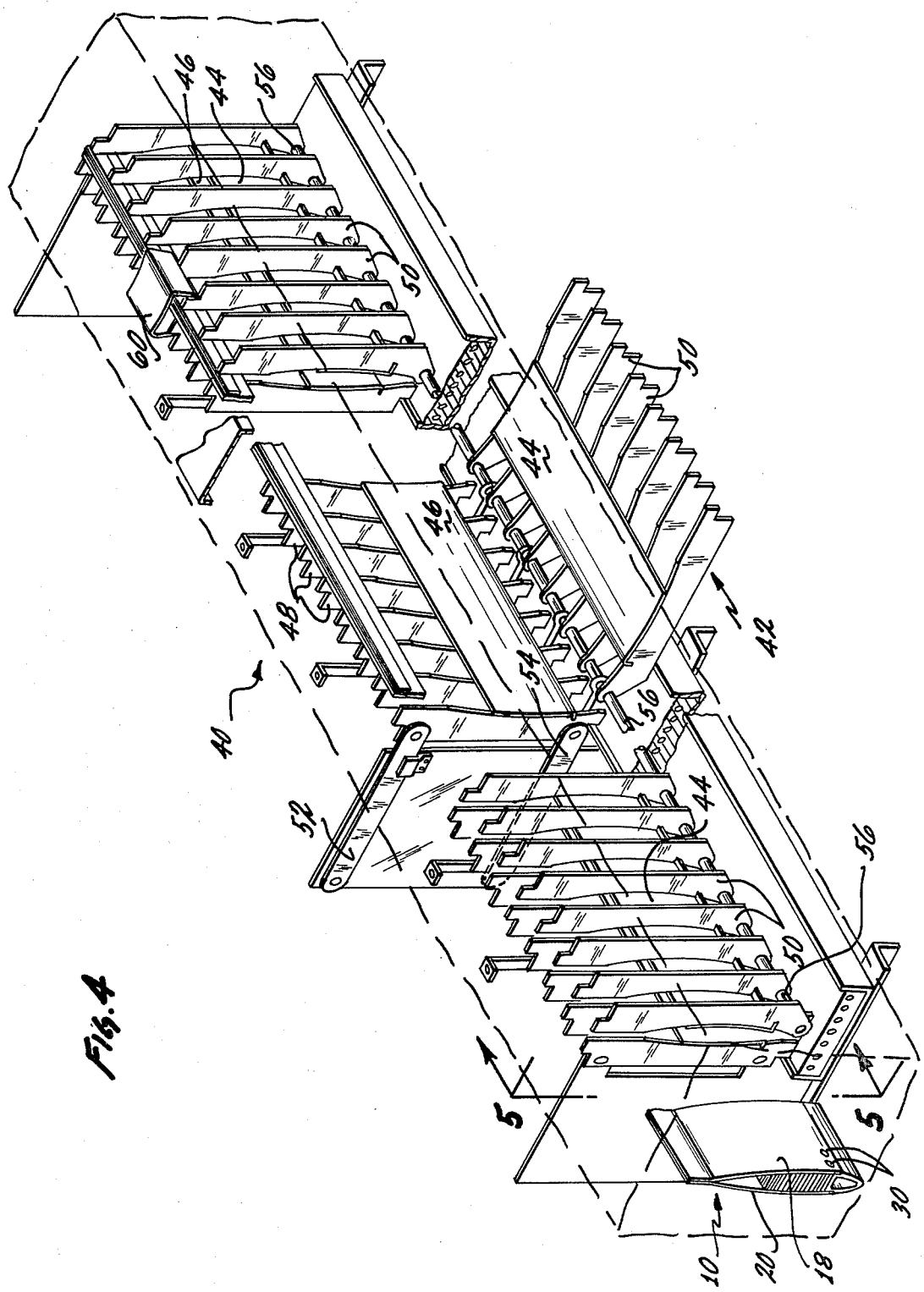
FIG. 4 is a perspective view of the fixture of the present invention used for holding the rotor blade during curing at an elevated temperature.

The fixture 40 is shown in FIG. 4 has been found to be suitable for clamping the rotor blade 10 during the bonding process.

Figure 5:
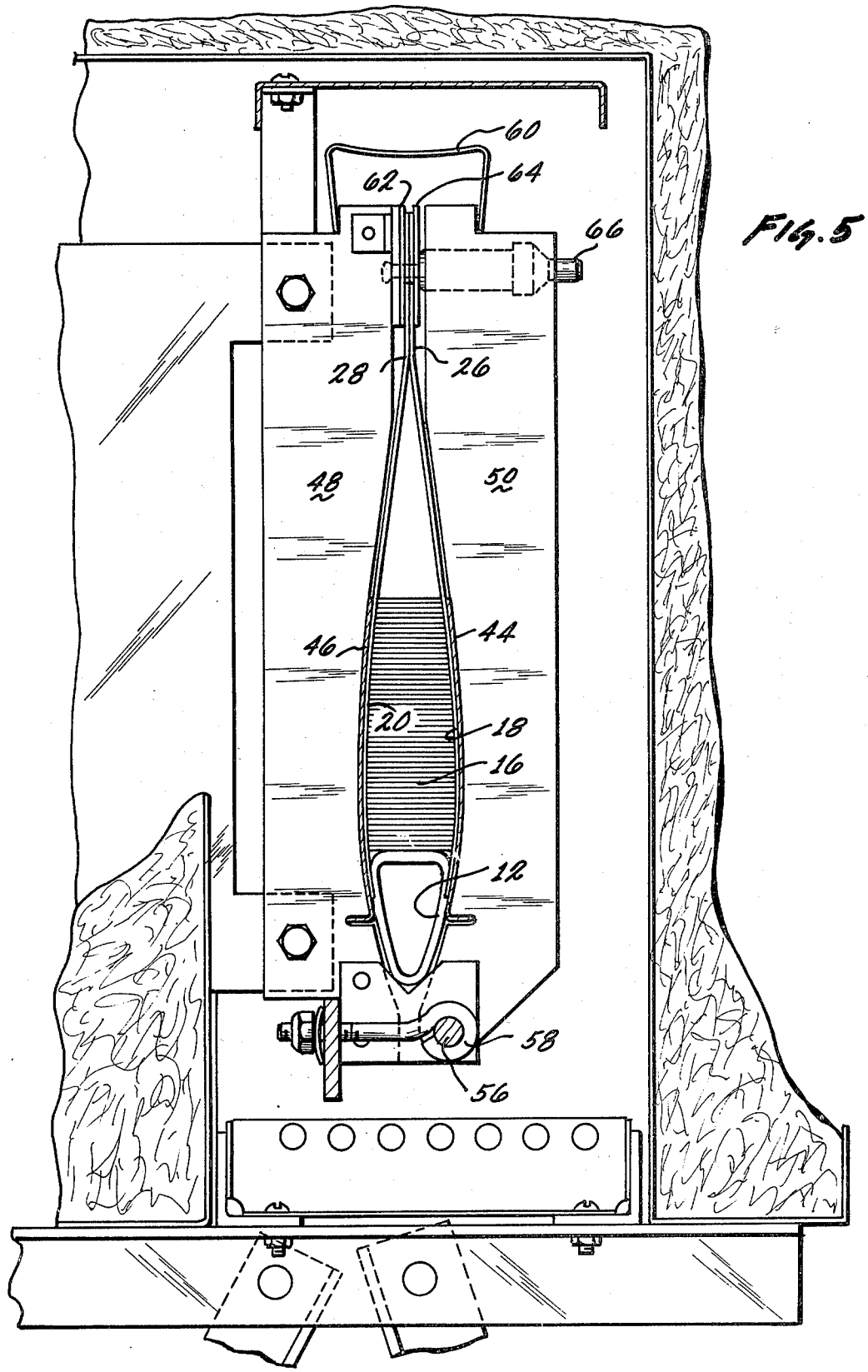
FIG. 5 is an end view of the fixture of FIG. 4.
Figure 6:
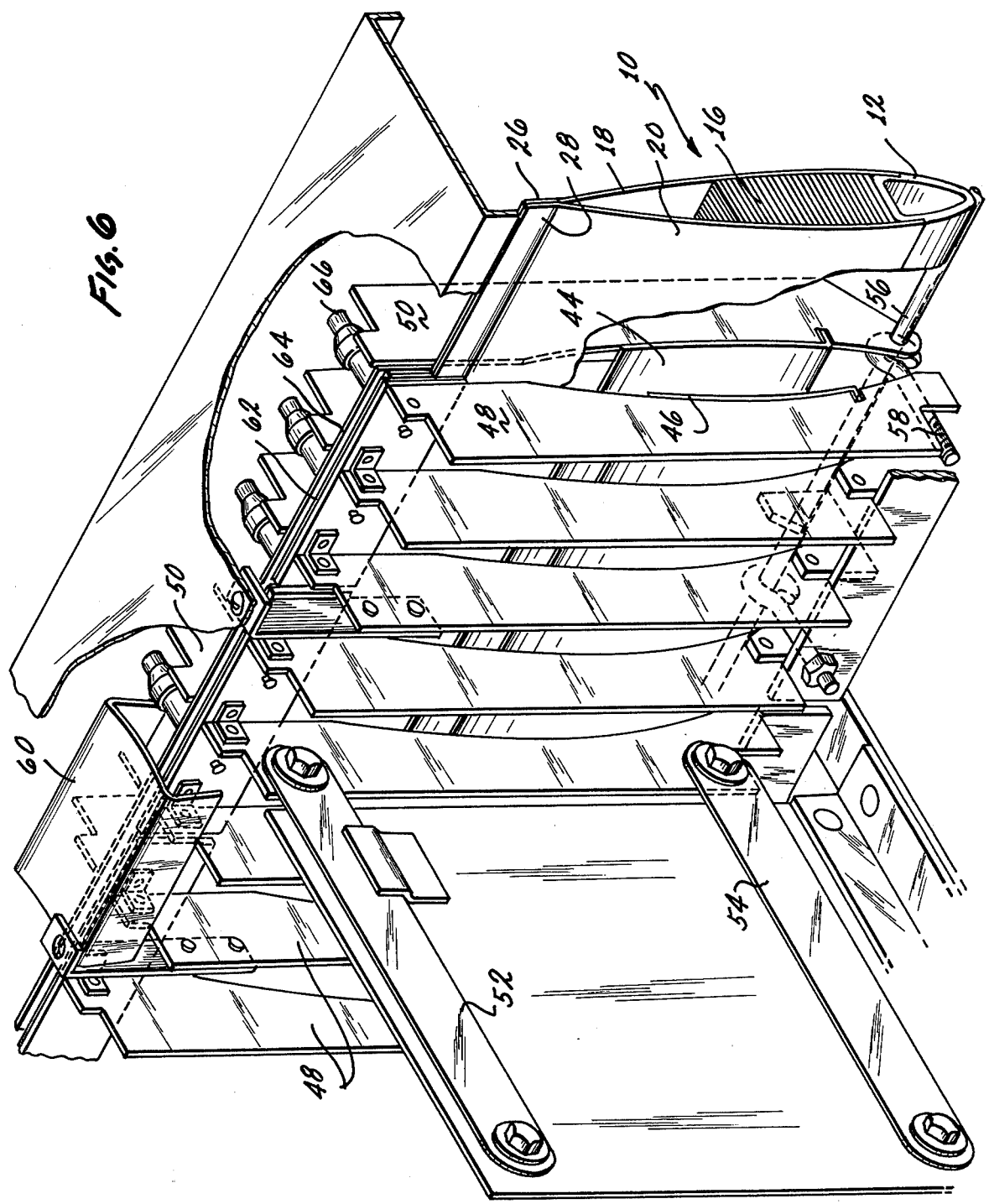
FIG. 6 is a fractional perspective view of the fixture of FIG. 4 showing a portion of it in greater detail; and, FIG. 7 is a flow diagram of the process for bonding rotor blades according to a preferred embodiment of the present invention.

As shown in FIGS. 4–6, the fixture 40 includes a plurality of support ribs 42 which clamp the skin 14 in place. As seen in FIG. 4, curved clamping plates 44, 46 distribute the clamping forces over the panels 18, 20. The fixture 40 is constructed in sections as shown in FIG. 4 and a space is left between the sections of the clamping plates for thermal expansion along the rotor blade 10. Each of the sections includes a set of stationary support ribs 48 as well as a hinged group of support ribs 50.

As seen in FIG. 4 and as seen more clearly in FIG. 6, sections of the fixture 40 are supported by two arms 52, 54 which are arranged to form a parallelogram to permit the sections to move vertically in accordance with the blowing of the rotor blade 10.

The hinged support ribs 50 are typically mounted on a rod 56 which runs the length of the fixture. As best seen in FIGS. 5 and 6, a number of eye bolts 58 are mounted on the rod 56 and are used to pull the portion of the hinged support ribs 50 adjacent the spar 12 more tightly against the panel of skin 18. At the rear portions of the rotor blade a clamp 60 is used to urge the support ribs together.

The panels 18, 20 are clasped at their rear portions 26, 28 between strips of metal 62, 64, which are held by the removable fasteners 66.

Electrical heating wires 68 extend in a channel 70 below the rotor blade to heat it to the elevated temperature required to set the bonding adhesive. A removable insulated cover is provided to conserve heat.

The present invention will be better understood by the following discussion of the method by which the fixture is used to produce the rotor blades. As described above, before the parts of the blade are placed into the fixture, the root fitting 72 is fastened to the spar 12. Then the root fitting and spar are laid into the fixture and the panel 20 is inserted into the fixture against the clamping plate 46. It is understood that adhesive is applied where appropriate between the various parts as they are assembled. Next, the honeycomb 16 is put into place and at the end of the rotor blade a tip cap (not shown) is added to the rotor blade. Next, the panel 18 of skin is set in place and the hinged support ribs are raised so that the clamping plate 44 contacts the panel 18.

Next, the rear portions 26, 28 of the panels 18, 20 are clamped between the plates 62, 64 by the removable fasteners 66, and the clamps 60 are set in place to urge the support ribs 48, 50 together.

Next, the eye bolts 58 are tightened to draw the support ribs 50 more snugly against the panel 18, and the removable insulated cover 70 is placed over the fixture. The fixture, including the rotor blade, is then heated to a temperature greater than the curing temperature by means of the electrical heater wires 68, and is maintained at that temperature until the adhesive cures. When the rotor blade is at the elevated temperature, the arms 52, 54 permit the sections of the fixture to move vertically to accommodate the bowing produced by the dissimilar coefficients of thermal expansion, while preventing the blade from twisting and while holding the components of the blade together to prevent buckling or relative motion between them. After the adhesive has cured, the heat is turned off and the fixture and rotor blade are allowed to cool to room temperature. Finally, the rotor blade is removed from the fixture.

The foregoing detailed description illustrates a preferred embodiment of the invention, and it is to be understood that additional embodiments will be obvious to those skilled in the art. The embodiments described herein, together with additional embodiments, are considered to be within the scope of the invention.

I claim:

1. A process for bonding together into a composite structure parts having different coefficients of thermal expansion by means of an adhesive which cures at a curing temperature different from a use temperature at which the structure is to be used, the process comprising the steps of:

applying the adhesive in an uncured state to the parts;

affixing the parts together rigidly at the use temperature to form the composite structure prior to curing the adhesive; and, curing the adhesive at the curing temperature while keeping the parts affixed together and simultaneously permitting the composite structure to bow in accordance with the different coefficients of thermal expansion of the parts.

2. The process of claim 1 further comprising the step of:

placing, after the affixing step, the composite structure in a fixture which permits the composite structure to bow in accordance with the different coefficients of thermal expansion of the parts, as the temperature is changed.

3. The process of claim 1 wherein the affixing step further comprises attaching the parts to each other with a fastener.

4. The process of claim 1 wherein the affixing step further comprises bonding the parts to each other with an adhesive that cures at the use temperature.

5. The process of claim 1 wherein the affixing step further comprises tightly clamping the parts to each other with a clamp.

6. The process of claim 1 wherein the affixing step further comprises joining the parts to each other by welding them.

7. A process for bonding together into a composite structure parts having different coefficients of thermal expansion by means of an adhesive which cures at a curing temperature different from the use temperature at which the structure is to be used, the process comprising the steps of:
applying the adhesive in an uncured state to the parts;
affixing the parts together rigidly at the use temperature to form the composite structure;
changing the temperature of the composite structure from the use temperature to the curing temperature;
maintaining the composite structure at the curing temperature until the adhesive has cured, while keeping the parts affixed together and simultaneously permitting the composite structure to bow in accordance with the differeng coefficients of thermal expansion of the part; and,
changing the temperature of the composite structure from the curing temperature to the use temperature after the adhesive has cured.

8. The process of claim 7 further comprising the step of:
placing, after the affixing step, the composite structure in a fixture which permits the composite structure to bow in accordance with the different coefficients of thermal expansion of the parts, as the temperature is changed.

9. The process of claim 7 wherein the affixing step further comprises attaching the parts to each other with a fastener.

10. The process of claim 7 wherein the affixing step further comprises bonding the parts to each other with an adhesive that cures at the use temperature.

11. The process of claim 7 wherein the affixing step further comprises tightly clamping the parts to each other with a clamp.

12. The process of claim 7 wherein the affixing step further comprises joining the parts to each other by welding them.

13. A process for bonding together into a composite structure parts having different coefficients of thermal expansion by means of an adhesive which cures at a curing temperature different from a use temperature at which the structure is to be used, the process comprising the steps of:
affixing the parts together rigidly at the use temperature to form the composite structure prior to curing the adhesive;
applying the adhesive in an uncured state to the parts; and,
curing the adhesive at the curing temperature while keeping the parts affixed together and simultaneously permitting the composite structure to bow in accordance with the different coefficients of thermal expansion of the parts.

14. A process for bonding together into a composite structure parts having different coefficients of thermal expansion by means of an adhesive which cures at a curing temperature different from the use temperature at which the structure is to be used, the process comprising the steps of:
affixing the parts together rigidly at the use temperature to form the composite structure;
applying the adhesive in an uncured state to the parts;
changing the temperature of the composite structure from the use temperature to the curing temperature;
maintaining the composite structure at the curing temperature until the adhesive has cured, while keeping the parts affixed together and simultaneously permitting the composite structure to bow in accordance with the different coefficients of thermal expansion of the parts; and,
changing the temperature of the composite structure from the curing temperature to the use temperature after the adhesive has cured.

* * * * *